H. T. SEBURN.
FRICTION WHEEL FOR STACKER TURN TABLES.
APPLICATION FILED JUNE 5, 1908.

923,204.

Patented June 1, 1909.

WITNESSES:
L. B. Woerner
W. Hurte

INVENTOR
Harvey T. Seburn
By Minturn & Woerner
Attorneys

UNITED STATES PATENT OFFICE.

HARVEY T. SEBURN, OF INDIANAPOLIS, INDIANA.

FRICTION-WHEEL FOR STACKER TURN-TABLES.

No. 923,204.

Specification of Letters Patent.

Patented June 1, 1909.

Application filed June 5, 1908. Serial No. 436,926.

*To all whom it may concern:*

Be it known that I, HARVEY T. SEBURN, a citizen of the United States, residing at Indianapolis, in the county of Marion and State of Indiana, have invented certain new and useful Improvements in Friction-Wheels for Stacker Turn-Tables, of which the following is a specification.

This invention relates to improvements in turntables for pneumatic stackers and its object is to provide friction rollers which while reducing the friction and wear between the movable parts of the turntable also act as a retaining means to hold the parts of the turntable together in operative relation.

Figure 1:
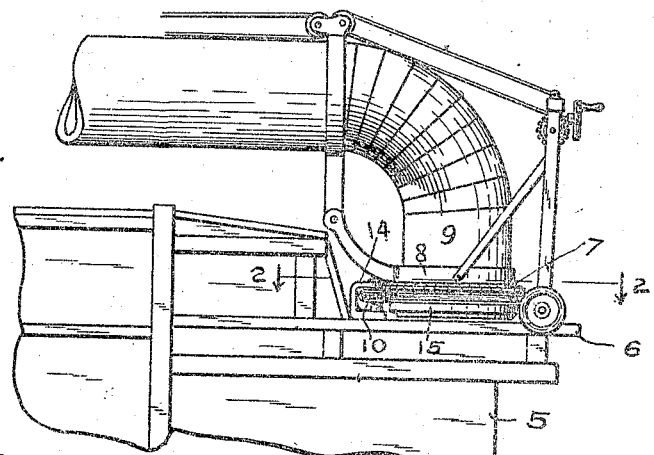
Figure 2:
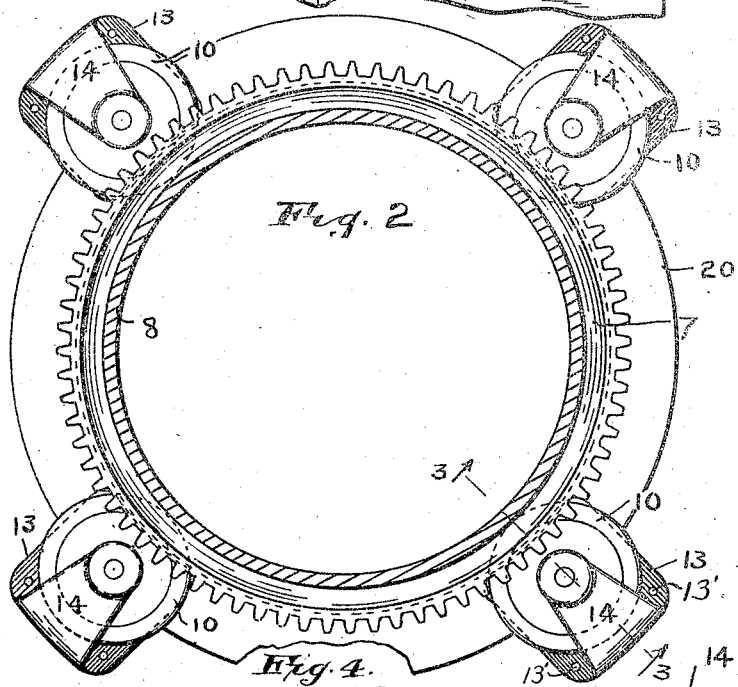
Figure 4:
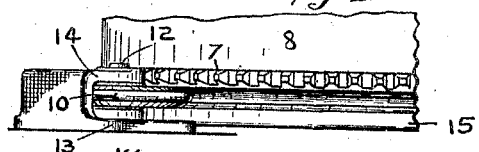
Figure 3:
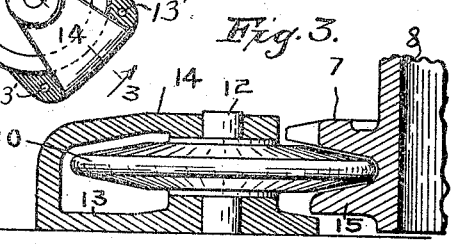

Referring to the accompanying drawing which illustrates my invention, Figure 1 is a detail in side elevation of a portion of a threshing machine equipped with my invention. Fig. 2 is a horizontal section on the line 2—2 of Fig. 1. Fig. 3 is a detail in vertical section on the line 3—3 of Fig. 2, and Fig. 4 is a detail in side elevation of the same roller and associated parts as are shown in Fig. 3.

Like characters of reference indicate like parts throughout the several views.

5 represents the body of a threshing machine and 6 the platform on which the turn-table is mounted.

7 is the master-wheel of the turntable having circumferential teeth for engagement by a worm or other means for rotating the wheel. The wheel 7 has the vertical flange 8 around a circular central opening, for the attachment thereto of the stacker tube 9. 10 are a plurality of friction rollers, here shown as four in number, which are mounted in fixed positions on the platform 6 equidistant from each other around the wheel 7. These rollers 10 are horizontal and project under the wheel 7 and form supports for said wheel which wheel bears upon said rollers in the manner shown in the drawing. The weight of wheel 7 and super-imposed stacker tube 9 and attached mechanism is thus supported upon the rollers 7. The rollers 10 are mounted on spindles 12 which are journaled in a bottom plate 13 and an upper plate 14. The plates 13 and 14 are integrally connected around the outer face of the friction roller in the manner shown, and the lower plate is fastened to platform 6 by suitable bolts which are passed through the bolt-holes 13'. The upward movement or lifting of the wheel 7 off of rollers 10 is prevented by flange 15 which is cast integral with the vertical flange or extension 8 and extends in an annular direction under and adjacent to the rollers 10. Any vertical displacement of the wheel 7 is thus prevented by the contact of the annular flange 15 with the under sides of rollers 10. It will thus be seen that the rollers 10 not only serve to lessen the friction between the moving parts of the turntable, but also serve as fastening means to retain the movable members of the turntable in proper position upon the platform 6.

Having thus fully described my invention what I desire to secure by Letters Patent of the United States, is—

1. In a turntable for pneumatic stackers, a stacker tube, a toothed wheel mounted on the lower end of said tube, an annular flange parallel with the wheel and located below and adjacent thereto, and a plurality of horizontal friction rollers retained in fixed position relative to said tube and wheel and extending between said wheel and flange to relieve the friction and also to retain the tube and wheel in normal operative position.

2. In a turntable for pneumatic stackers, a toothed master wheel having an integral vertical flange and a parallel horizontal flange below said wheel, a stacker tube attached to the vertical flange, a machine platform and a plurality of horizontal friction wheels or rollers fastened in a fixed manner to said platform and extending between the toothed wheel and under-lying flange.

3. In a turntable for pneumatic stackers, a stacker tube, a toothed master wheel surrounding said tube and turning therewith, a flange secured to the tube under the toothed wheel adjacent to and parallel therewith, a stacker platform and a plurality of horizontal friction wheels secured in a fixed manner to the said platform and extending between the toothed wheel and underlying flange to relieve the friction and also to hold the wheel and tube in operative position on said platform.

In witness whereof, I, have hereunto set my hand and seal at Indianapolis, Indiana, this 29th day of May, A. D. one thousand nine hundred and eight.

HARVEY T. SEBURN. [L. S.]

Witnesses:
F. W. WOERNER,
L. B. WOERNER.